(12) United States Patent
Matsumoto

(10) Patent No.: US 8,493,971 B2
(45) Date of Patent: Jul. 23, 2013

(54) PATH CALCULATION SYSTEM

(75) Inventor: Yuzo Matsumoto, Tokyo (JP)

(73) Assignee: Nec Corporation, Tokyo (JP)

( * ) Notice: Subject to any disclaimer, the term of this patent is extended or adjusted under 35 U.S.C. 154(b) by 320 days.

(21) Appl. No.: 12/911,006

(22) Filed: Oct. 25, 2010

(65) Prior Publication Data
US 2011/0110368 A1  May 12, 2011

(30) Foreign Application Priority Data

Nov. 6, 2009 (JP) ................................ 2009-254729

(51) Int. Cl.
*H04L 12/66* (2006.01)

(52) U.S. Cl.
USPC ........... 370/356; 370/392; 370/397; 370/399; 370/395.31; 370/401; 370/409; 370/411; 370/466; 370/469

(58) Field of Classification Search
USPC ................. 370/355, 356, 389, 392, 397, 399, 370/395.31, 401, 409, 411, 466, 469
See application file for complete search history.

(56) References Cited

U.S. PATENT DOCUMENTS

| | | | | | |
|---|---|---|---|---|---|
| 6,128,284 | A | * | 10/2000 | Kawamura et al. | 370/241 |
| 6,158,009 | A | * | 12/2000 | Ayukawa et al. | 726/4 |
| 8,036,236 | B2 | * | 10/2011 | Ackerman et al. | 370/401 |
| 2004/0105389 | A1 | * | 6/2004 | Huang et al. | 370/238 |
| 2005/0141568 | A1 | * | 6/2005 | Kwak et al. | 370/539 |

FOREIGN PATENT DOCUMENTS

JP  2000232472 A  8/2000

* cited by examiner

*Primary Examiner* — Alvin Zhu

(57) ABSTRACT

A network management system (NMS) maintains topology information of a network allowing coexistence of PDH network and SDH network. The network management system (NMS) generates a topology data for path calculation in a path calculation device in accordance with the topology information of the network after converting topology information of the PDH network into topology information of an SDH network. The path calculation device calculates the optimum path in answer to a path calculation request from the network management system (NMS) on the basis of the topology data for path calculation generated therein, and returns the calculation result. The network management system (NMS) reverts the SDH network topology information generated through conversion from the PDH network topology information among the SDH network topology information included in the calculation result received from the path calculation device to the PDH network topology information before the conversion.

12 Claims, 20 Drawing Sheets

FIG. 3

| PDH TRANSFER RATE | PSEUDO SDH LAYER RATE |
|---|---|
| 1.5M | VC11 |
| 2M | VC12 |
| 34M/45M | VC3 |
| 140M | VC4 |

12B1

<PHYSICAL NETWORK EXAMPLE>

○ : PDH DEVICE    □ : SDH DEVICE WITH VC11/VC12/VC3
                      (LOWER LAYER)
                  ▪ : SDH DEVICE WITHOUT VC11/VC12/VC3
                      (LOWER LAYER)

<LOWER LAYER>

<UPPER LAYER>

FIG. 9

| LINK (SECTION) | PRE-CONVERSION | POST-CONVERSION |
|:---:|:---:|:---:|
| A−D | 2M | VC12 |
| B−E | 140M | VC4 |
| C−E | 140M | VC4 |
| D−a | 2M | VC12 |
| E−b | 140M | VC4 |
| g−F | 2M | VC12 |
| g−G | 140M | VC4 |

FIG. 10

| LINK (SECTION) | PRE-CONVERSION | POST-CONVERSION |
|---|---|---|
| A–D | Ch10 | TS=10 |
| B–E | Ch1 | TS=1 |
| C–E | Ch1 | TS=1 |
| D–a | Ch15 | TS=15 |
| E–b | Ch1 | TS=1 |
| g–F | Ch20 | TS=20 |
| g–G | Ch1 | TS=1 | a, b, and g: devices with 2M electrical interface and STM4 optical interface.

FIG. 12

| Name | Type | SDH/PDH | Name | Type | SDH/PDH |
|---|---|---|---|---|---|
| A | Node | PDH | A–D | Link | PDH |
| B | Node | PDH | B–E | Link | PDH |
| C | Node | PDH | C–E | Link | PDH |
| D | Node | PDH | D–a | Link | PDH |
| E | Node | PDH | E–b | Link | PDH |
| F | Node | PDH | a–b | Link | SDH |
| G | Node | PDH | a–e | Link | SDH |
| a | Node | SDH | b–c | Link | SDH |
| b | Node | SDH | e–d | Link | SDH |
| c | Node | SDH | c–d | Link | SDH |
| d | Node | SDH | d–f | Link | SDH |
| e | Node | SDH | d–h | Link | SDH |
| f | Node | SDH | f–g | Link | SDH |
| g | Node | SDH | h–g | Link | SDH |
| h | Node | SDH | g–F | Link | PDH |
| — | — | — | g–G | Link | PDH |

<SDH PHYSICAL NETWORK EXAMPLE>

<In calculating/generating lower order path (VC12)>

◇ : VC12 ENDPOINT

<PDH PHYSICAL NETWORK EXAMPLE>

<In calculating/generating 2M path>

◆ : 2M ENDPOINT

PATH CALCULATION SYSTEM

INCORPORATION BY REFERENCE

The present application claims priority from Japanese Patent Application No. 2009-254729, filed on Nov. 6, 2009 in Japan, the disclosure of which is incorporated herein by reference in its entirety.

TECHNICAL FIELD

The present invention relates to techniques for calculating communication paths on the network allowing coexistence of PDH network and SDH network.

BACKGROUND ART

Path calculation systems are proposed and put into practical use for calculating the optimum path (the shortest path, for example) from a node as the start node to another node as the end node on an SDH (Synchronous Digital Hierarchy) network.

For example, the path calculation system described in the Patent Document 1 specified hereinbelow first establishes network topology information in a database including information of the nodes which constitute the SDH network, and information of the links which connect the nodes. Next, the path calculation system generates a topology data for actual path calculation from the network topology information maintained in the database. In particular, it arranges the nodes into lines and columns so as to generate the topological lines and columns on which a value has been assigned to each element of the lines and columns to indicate whether or not there is a link including an unused time slot between the corresponding nodes. Then, the path calculation system utilizes an ordinary path calculation algorithm such as Dijkstra's algorithm and the like to calculate the shortest path based on the topology data for between the start node and the end node on the request of path calculation from the operator.

[Patent Document 1] JP 2000-232472 A

However, with the related technology described hereinabove, there is a problem that it is impossible to calculate optimum paths for an entire network allowing coexistence of PDH (Plesiochronous Digital Hierarchy) network and SDH network as the object. The reason is that the conception of time slot does not exist in the PDH network, etc., and thereby the topology data for path calculation are different between a PDH network and an SDH network.

SUMMARY

In view of the above, an exemplary object of the present invention is to provide a path calculation system for solving the problem that it is impossible to calculate optimum paths at a time for an entire network allowing coexistence of PDH network and SDH network as the object with the path calculation system for SDH network.

An aspect in accordance with the present invention provides a path calculation system including: a network management system (NMS) for maintaining topology information of a network allowing coexistence of PDH network and SDH network; and a path calculation device for calculating the optimum path in answer to a path calculation request from the network management system (NMS) on the basis of a topology data for path calculation generated therein, and transmitting the calculation result to the network management system (NMS), the network management system (NMS) generating the topology data for path calculation in the path calculation device in accordance with the topology information of the network after converting topology information of the PDH network into topology information of an SDH network, and reverting the SDH network topology information generated through conversion from the PDH network topology information among the SDH network topology information included in the calculation result received from the path calculation device to the PDH network topology information before the conversion.

Another aspect in accordance with the present invention provides a path calculation method for carrying out path calculation through cooperation of a network management system (NMS) for maintaining topology information of a network, allowing coexistence of PDH network and SDH network with a path calculation device connected to the network management system (NMS) via a communication line, the method including the steps of: converting topology information of the PDH network in the topology information of the network into topology information of an SDH network by virtue of the network management system (NMS); transmitting a path calculation request to the path calculation device after generating a topology data for path calculation in the path calculation device in accordance with the topology information of the network after the converting by virtue of the network management system (NMS); calculating the optimum path in answer to the path calculation request from the network management system (NMS) on the basis of the topology data for path calculation generated in the path calculation device, and transmitting the calculation result to the network management system (NMS) by virtue of the path calculation device; and reverting the SDH network topology information generated through conversion from the PDH network topology information among the SDH network topology information included in the calculation result received from the path calculation device to the PDH network topology information before the conversion by virtue of the network management system (NMS).

Still another aspect in accordance with the present invention provides a network management system including: a topology information storage unit for maintaining topology information of a network allowing coexistence of PDH network and SDH network; a topology data conversion unit for carrying out conversion between topology information of a PDH network and topology information of an SDH network; a path-calculation-use topology data generation unit for generating a topology data for path calculation in a path calculation device in accordance with the topology information of the network after converting topology information of the PDH network into topology information of an SDH network by utilizing the topology data conversion unit; and a path calculation request acceptance/result output unit for transmitting a path calculation request inputted from an input operation portion to the path calculation device, reverting the SDH network topology information generated through conversion from the PDH network topology information among the SDH network topology information included in the calculation result received from the path calculation device to the PDH network topology information before the conversion by utilizing the topology data conversion unit, and outputting the reverted result on a screen display portion.

Because the present invention is such configured as described hereinabove, it is possible to calculate optimum paths for an entire network allowing coexistence of PDH network and SDH network as the object.

BRIEF DESCRIPTION OF THE DRAWINGS

FIG. 3 shows an example of the topology conversion rule utilized in the path calculation system in accordance with the second exemplary embodiment of the present invention;

FIG. 9 shows an example of pseudo-converting PDH transfer rates into SDH layer rates;

FIG. 10 shows an example of pseudo-converting PDH channel numbers into SDH time slot numbers;

FIG. 12 shows an example of maintaining the identifiers for distinguishing PDH from SDH in a tabular form with respect to the topology data for path calculation;

EXEMPLARY EMBODIMENTS

Next, descriptions will be made in detail with respect to exemplary embodiments of the present invention in reference to the accompanying drawings.

A First Exemplary Embodiment

Figure 1:
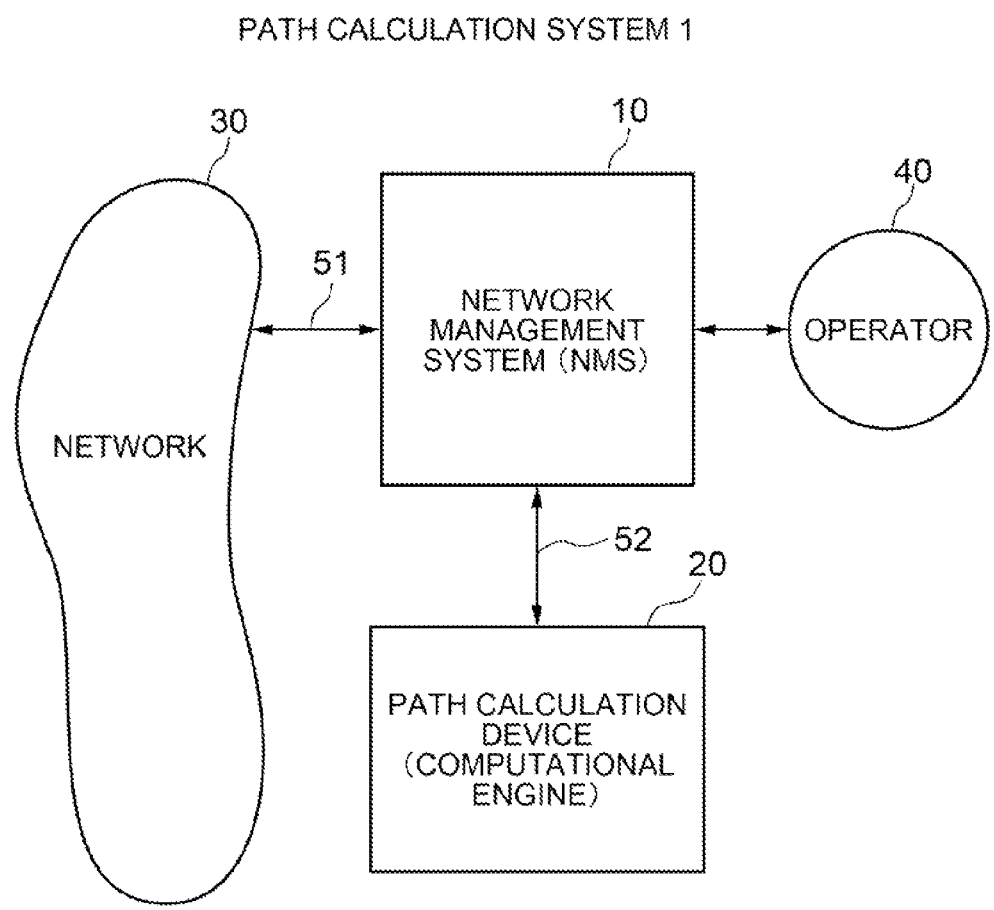
FIG. 1 is a block diagram of a path calculation system in accordance with a first exemplary embodiment of the present invention.

In reference to FIG. 1, a path calculation system 1 in accordance with a first exemplary embodiment of the present invention has a function of calculating the optimum path from a node as the start node to another node as the end node on a network 30 allowing coexistence of PDH network and SDH network. Herein, the optimum path means the path through which the sum of metric or cost defined over the pass-through links becomes the minimum.

The path calculation system 1 of the first exemplary embodiment is composed of a network management system (NMS) 10 (to be simply referred to as NMS hereinbelow) in connection with the network 30 via a communication line 51, and a path calculation device 20 (computational engine) in connection with the NMS 10 via a communication line 52.

The path calculation device 20 is a computer for calculating the optimum path in answer to a path calculation request from the NMS 10 on the basis of the topology data for path calculation generated therein, and transmitting the calculation result to the NMS 10.

The NMS 10 is a computer for monitoring and controlling the conditions of each node and each link within the network 30. The NMS 10 has a function of maintaining topology information of the network 30 and cooperating with the path calculation device 20 to calculate the optimum path linking two nodes on the network 30 in answer to the path calculation request inputted from an operator 40 on the basis of the topology information of the network 30.

In particular, the NMS 10 has a function of converting the topology information of a PDH network into the topology information of an SDH network. Further, the NMS 10 has a function of utilizing the function of converting the topology information to generating the topology data for path calculation in the path calculation device 20 in accordance with the topology information of the network 30 after converting the topology information of the PDH network into the topology information of the corresponding SDH network. Further, the NMS 10 has a function of transmitting the path calculation request inputted from the operator 40 to the path calculation device 20 and receiving the calculation result from the path calculation device 20, and utilizing the function of converting the topology information to revert the SDH network topology information generated through conversion from the PDH network topology information among the SDH network topology information included in the calculation result received from the path calculation device to the PDH network topology information before the conversion and display it to the operator 40.

In this manner according to the first exemplary embodiment, because the topology data for path calculation is generated in accordance with the topology information of the network 30 after converting the topology information of the PDH network into the topology information of the SDH network, it is possible to calculate optimum paths for the entire network 30 allowing coexistence of PDH network and SDH network as the object by utilizing the path calculation function for SDH network.

A Second Exemplary Embodiment

Next, descriptions will be made with respect to a path calculation system in accordance with a second exemplary embodiment of the present invention.

First, a description will be made with respect to an NMS 10 of the path calculation system in accordance with the second exemplary embodiment of the present invention.

Figure 2:
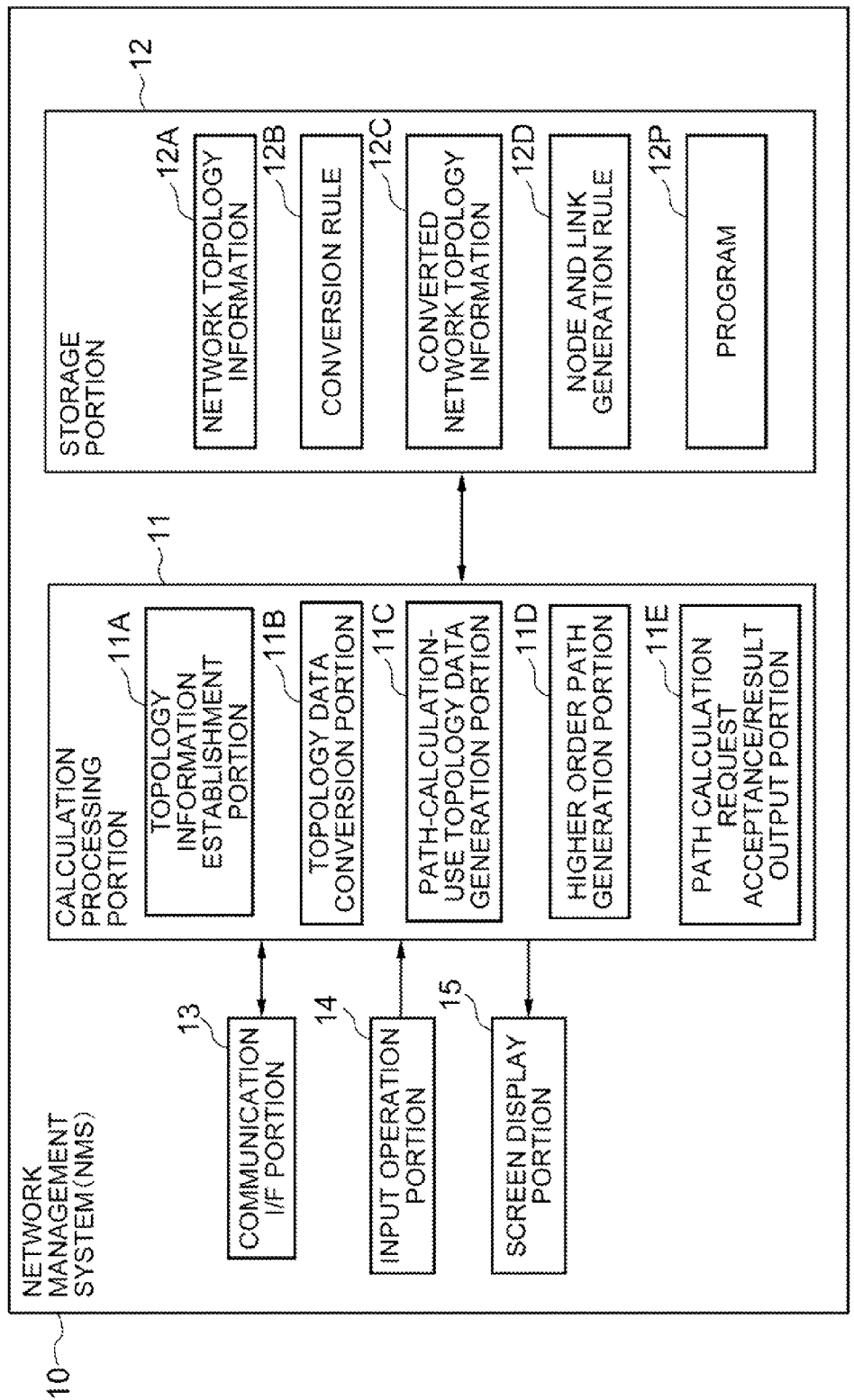
FIG. 2 is a block diagram of a network management system (NMS) of a path calculation system in accordance with a second exemplary embodiment of the present invention.

In reference to FIG. 2, the NMS 10 of the path calculation system in accordance with the second exemplary embodiment of the present invention is constituted by a computer such as a personal computer and the like, and has a function of monitoring and controlling the conditions of each node and each link within the network 30, and a function of calculating optimum paths on the network 30 by cooperating with the path calculation device 20.

The NMS 10 is provided, as main functional portions, with a calculation processing portion 11, a storage portion 12, a communication interface portion 13 (to be referred to as communication I/F portion hereinbelow), an input operation portion 14, and a screen display portion 15.

The communication I/F portion 13 is constituted by a dedicated data communication circuit and has a function of carrying out data communications with the respective nodes within the network 30 connected via the communication line 51, and with various devices such as the path calculation device 20 and the like connected via the communication line 52.

The input operation portion 14 is composed of input operation devices such as a keyboard, a mouse, and the like, and has a function of detecting an operation of the operator 40 and outputting it to the calculation processing portion 11.

The screen display portion 15 is constituted by a screen display device such as a liquid crystal display device or the like, and has a function of displaying on the screen various information such as the operation menu, the input screen for the path calculation request, the path calculation result, and the like in accordance with the instruction from the calculation processing portion 11.

The storage portion 12 is composed of storage devices such as hard disks, memories, and the like, and has a function of storing processing information and a program 12P needed for the various processes carried out in the calculation processing portion 11. The program 12P is a computer program to be read into the calculation processing portion 11 and implemented so as to realize various processing portions, and prestored in the storage portion 12 which has read it in from an external device (not shown) or a recording medium (not shown) via a data I/O unit such as the communication I/F portion 13 and the like. As main processing information stored in the storage portion 12, there are network topology information 12A, conversion rule 12B, converted network topology information 12C, and node and link generation rule 12D.

The network topology information 12A shows the configuration of the entire network 30 allowing coexistence of PDH network and SDH network. The network topology information 12A includes various information with respect to the respective nodes which constitute the network 30, and various information with respect to the links which connect the nodes. In the various information with respect to the nodes, there are node identifiers, type information indicating either a PDH node or an SDH node, port information, and the like. Further, in the various information with respect to the links, there are link identifiers, type information indicating either a PDH link or an SDH link, link usage conditions, transfer rates, metric and cost conferred to the links, and the like. In the link usage conditions, there are information of used channels and unused channels in the case of a PDH link, and information of used time slots and unused time slots in the case of an SDH link.

Figure 4:
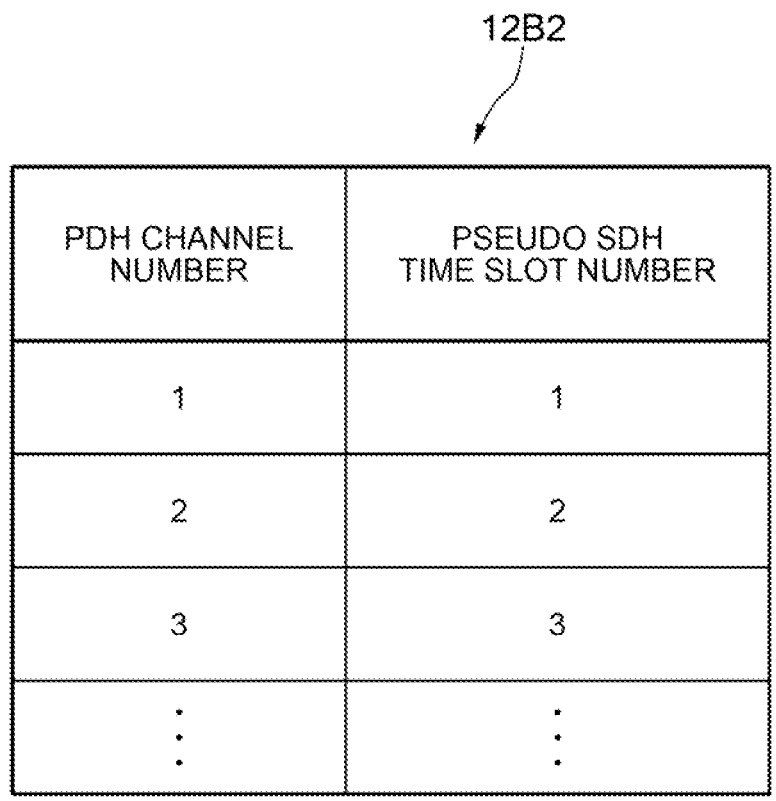
FIG. 4 shows another example of the topology conversion rule utilized in the path calculation system in accordance with the second exemplary embodiment of the present invention.

The conversion rule 12B is a rule for converting the topology information of a PDH network into the topology information of the corresponding SDH network. FIGS. 3 and 4 show examples of configuring the conversion rule 12B. The conversion rule 12B1 of FIG. 3 shows the conversion of PDH transfer rates into the equivalent SDH layer rates. The conversion rule 12B2 of FIG. 4 shows the conversion of PDH channel numbers into the equivalent SDH time slot numbers.

The converted network topology information 12C is generated from the topology information in the network topology information 12A by converting the topology information of the PDH network into the topology information of the corresponding SDH network using the conversion rule 12B, and copying the topology information of the SDH network as it is. The converted network topology information 12C utilizes identifiers and the like to clearly distinguish the topology information of the SDH network generated through conversion of the topology information of the PDH network from other topology information.

Figure 5:
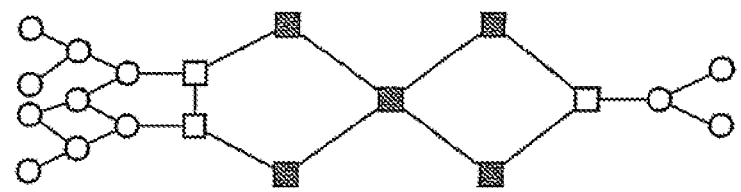
FIG. 5 shows an example of the topology information of a network allowing coexistence of PDH network and SDH network and the topology data for path calculation.
Figure 5:
Figure 5:
Figure 5:
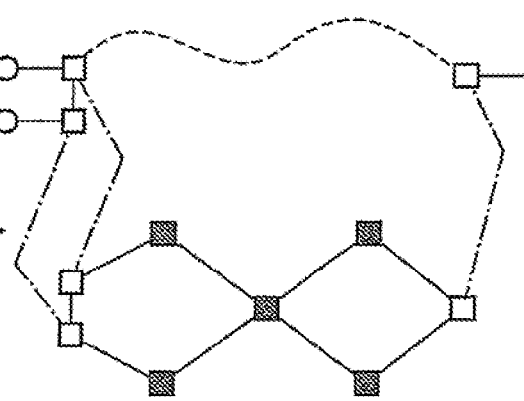

The node and link generation rule 12D is a rule to be applied in generating the topology data for path calculation in the path calculation device 20 in accordance with the converted network topology information 12C. The node and link generation rule 12D is composed of six rules R1 to R6 which will be explained hereinbelow. Further, FIG. 5 shows an example of the topology information 12C of a network allowing coexistence of PDH network and SDH network, and an example of the topology data for path calculation generated by applying the node and link generation rule 12D to the network topology information 12C of the example. As shown in FIG. 5, the topology data for path calculation is composed of two layers: a lower layer and an upper layer. In addition, a dashed line (----) in FIG. 5 is generated as a link in generating higher order path while chain lines (-..-..-..-..) in FIG. 5 indicate connections between layers.

(1) Rule R1: As shown in FIG. 5, nodes and links of the PDH network are generated only on the lower layer but not on the upper layer.

Figure 20:
FIG. 20 is an explanatory diagram with respect to a higher order path.
Figure 20:
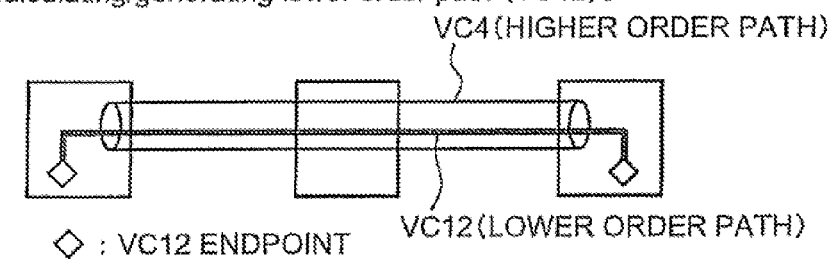
Figure 20:
Figure 20:
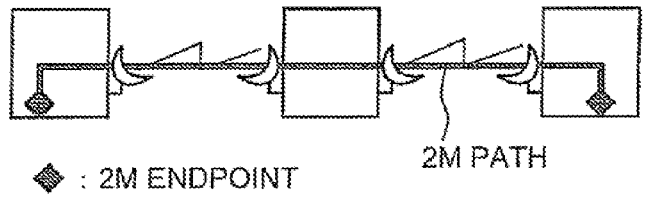

As shown in FIG. 20, in calculating a path of the lower order path on an SDH network, it is necessary to take into consideration the path of the higher order path through which the lower order path passes. On the contrary, because the PDH network is a single-layer network, it is not necessary to take the higher order path into consideration. Hence, the rule R1 is set up. In particular, in calculating a VC12 path (lower order path), it is necessary to calculate the VC4 path (higher order path). It is possible to pass 63 VC12 paths through one VC4 path; however, because the 64th path cannot be passed there through, it is necessary to secure a new VC4 path. On the other hand, higher order path is not necessary for calculating a 2M path.

(2) Rule R2: As shown in FIG. 5, nodes without endpoints of VC11/VC12/VC3 (the lower layer) and links for connecting the nodes on an SDH network are generated only on the upper layer but not on the lower layer.

Basically, the upper layer network is connected with a high-speed line such as VC4 or higher, while the lower layer network is connected with a low-speed line such as VC11/VC12/VC3. Therefore, nodes without the communication line of VC11/VC12/VC3 will not appear on the connection diagram of the lower layer network. Hence, the rule R2 is set up.

(3) Rule R3: As shown in FIG. 5, nodes with endpoints of VC11/VC12/VC3 (the lower layer) on an SDH network are generated both on the upper layer and on the lower layer.

(4) Rule R4: Links for connecting the nodes with endpoints of VC11/VC12/VC3 (the lower layer) on an SDH network are generated only on the upper layer.

(5) Rule R5: As shown in FIG. 5, when a higher order path is generated with an SDH device as the start point and another SDH device as the end point, the link corresponding to the generated higher order path is generated only on the lower layer.

The relation between a higher order path and a lower order path is similar to a line called lower order path which passes through a clay pipe called higher order path. Therefore, it is possible to represent a path of the lower order path on the lower layer by treating the path of the higher order path generated on the upper layer network as a link on the lower layer. In generating a higher order path, information of the A/Z endpoints (start point/end point) and the like is extracted from the information of the generated higher order path to generate information of the start point, the end point, and the like of the link to be generated.

(6) Rule R6: Identifiers are conferred to the nodes and links for distinguishing PDH from SDH.

The calculation processing portion 11 includes a microprocessor such as a CPU and the like, and the peripheral circuitry, and thereby has a function of realizing various processing portions through collaboration of the hardware with the program 12P by reading in the program 12P from the storage portion 12 and implementing it. As main processing portions realized in the calculation processing portion 11, there are a topology information establishment portion 11A, a topology data conversion portion 11B, a path-calculation-use topology data generation portion 11C, a higher order path generation portion 11D, and a path calculation request acceptance/result output portion 11E.

The topology information establishment portion 11A has a function of collecting information with respect to the nodes and information with respect to the links connecting the nodes from each node within the network 30 on the basis of the common routing protocol, and a function of generating the network topology information 12A based on the above information and storing the same in the storage portion 12.

The topology data conversion portion 11B has a function of pseudo-converting the topology information of a PDH network into the topology information of an SDH network with the conversion rule 12B, and a function of reverse converting, that is, reverting the pseudo-converted topology information of the SDH network to the topology information of the original PDH network.

The path-calculation-use topology data generation portion 11C has a function of transmitting a command for generating the topology data for path calculation to the path calculation device 20 by referring to the node and link generation rule 12D and following the converted network topology information 12C.

The higher order path generation portion 11D has a function of generating a higher order path in the network 30.

The path calculation request acceptance/result output portion 11E has a function of accepting the path calculation request from the operator 40 through the input operation portion 14, a function of transmitting the accepted path calculation request to the path calculation device 20 through the communication line 52, a function of receiving the calculation result in answer to the transmitted path calculation request from the path calculation device 20 through the communication line 52, and a function of reverting the SDH network topology information generated through conversion from the PDH network topology information among the SDH network topology information included in the calculation result received from the path calculation device to the PDH network topology information before the conversion by utilizing the topology data conversion portion 11B and displaying it to the operator 40 through the screen display portion 15.

Next, an explanation will be made with respect to the path calculation device 20 of the path calculation system in accordance with the second exemplary embodiment of the present invention.

Figure 6:
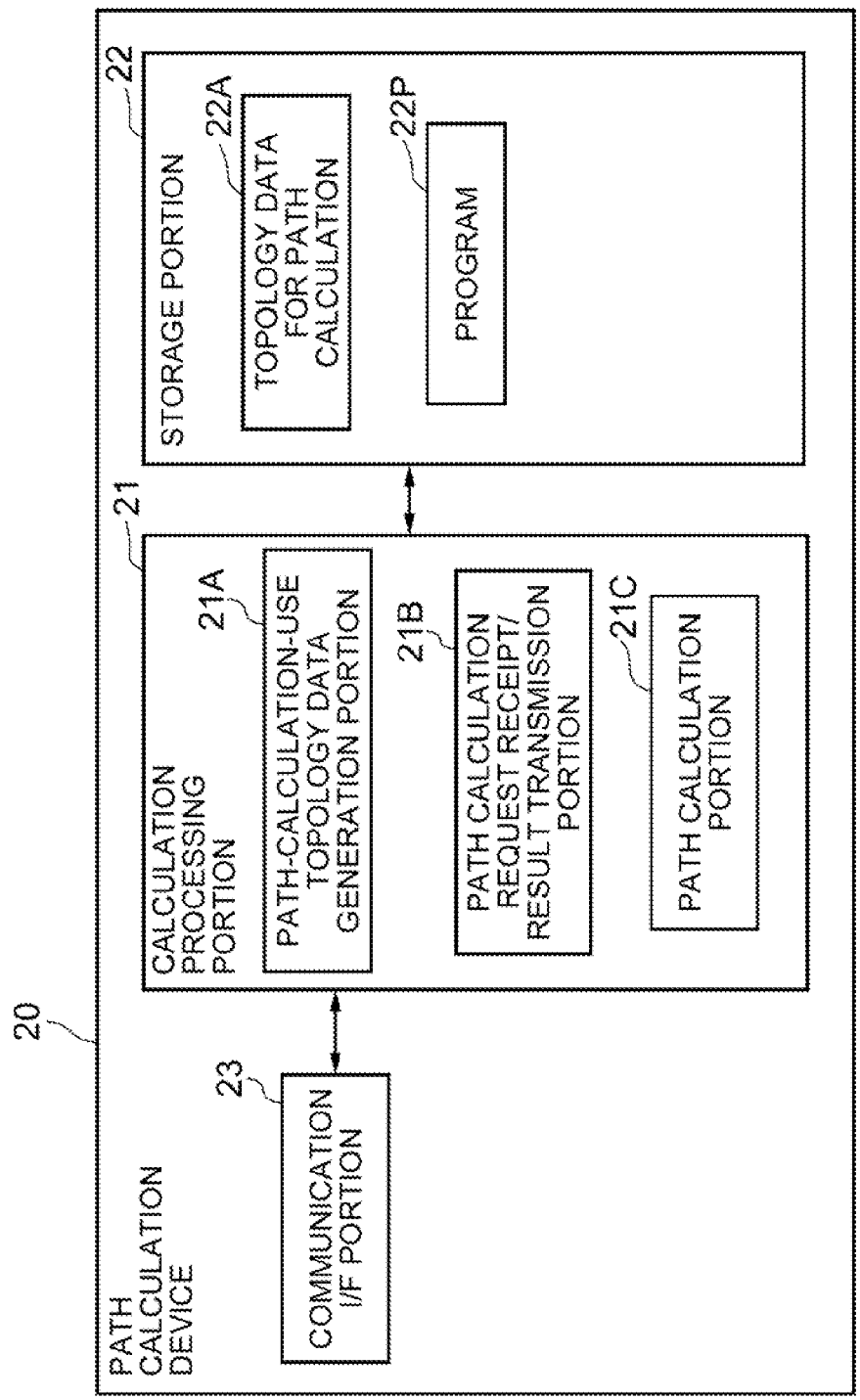
FIG. 6 is a block diagram of a path calculation device of the path calculation system in accordance with the second exemplary embodiment of the present invention.

In reference to FIG. 6, the path calculation device 20 of the path calculation system in accordance with the second exemplary embodiment of the present invention is constituted by a computer such as a personal computer and the like, and has a function of calculating optimum paths on the network 30 in cooperation with the NMS 10.

The path calculation device 20 is provided, as main functional portions, with a calculation processing portion 21, a storage portion 22, and a communication I/F portion 23.

The communication I/F portion 23 is constituted by a dedicated data communication circuit and has a function of carrying out data communications with various devices such as the NMS 10 and the like connected via the communication line 52.

The storage portion 22 is composed of storage devices such as hard disks, memories, and the like, and has a function of storing processing information and a program 22P needed for the various processes carried out in the calculation processing portion 21. The program 22P is a computer program to be read into the calculation processing portion 21 and implemented so as to realize various processing portions, and prestored in the storage portion 22 which has read it in from an external device (not shown) or a recording medium (not shown) via a data I/O unit such as the communication I/F portion 23 and the like. As main processing information stored in the storage portion 22, there is a topology data for path calculation 22A.

The topology data for path calculation 22A is the topology data of the network 30 utilized by the path calculation device 20 for path calculation.

The calculation processing portion 21 includes a microprocessor such as a CPU and the like, and the peripheral circuitry, and thereby has a function of realizing various processing portions through collaboration of the hardware with the program 22P by reading in the program 22P from the storage portion 22 and implementing it. As main processing portions realized in the calculation processing portion 21, there are a path-calculation-use topology data generation portion 21A, a path calculation request receipt/result transmission portion 21B, and a path calculation portion 21C.

The path-calculation-use topology data generation portion 21A has a function of generating the topology data for path calculation 22A requested for generation from the path-calculation-use topology data generation portion 11C in the storage portion 22 by executing the command received from the path-calculation-use topology data generation portion 11C of the NMS 10.

The path calculation request receipt/result transmission portion 21B has a function of receiving the path calculation request from the NMS 10 and conveying it to the path calculation portion 21C, and a function of receiving the calculation result in answer to the path calculation request from the path calculation portion 21C and transmitting it to the NMS 10.

The path calculation portion 21C has a function of calculating the optimum path based on the topology data for path calculation 22A in accordance with the path calculation request received from the path calculation request receipt/result transmission portion 21B, and returning the calculation result to the path calculation request receipt/result transmission portion 21B.

Next, explanations will be made on a behavior of the path calculation system in accordance with the second exemplary embodiment of the present invention.

Figure 7:
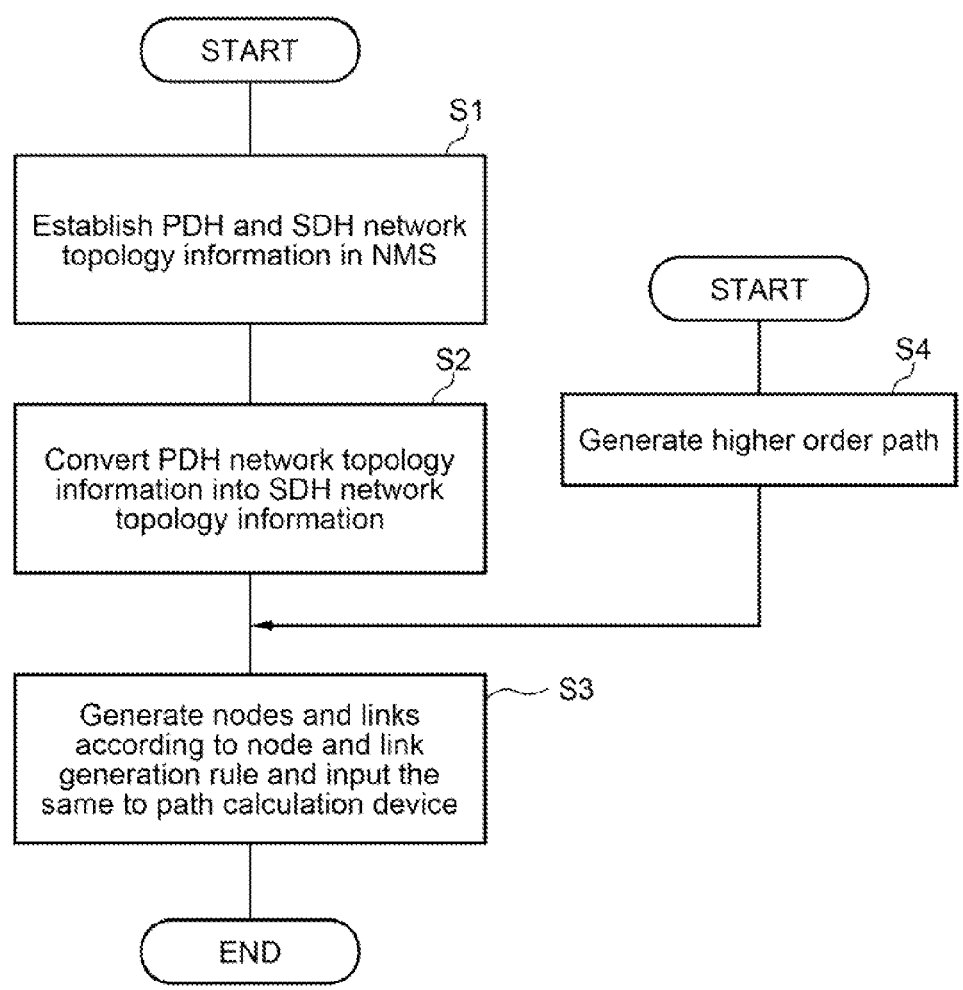
FIG. 7 is a flowchart showing a processing example of the path calculation system in accordance with the second exemplary embodiment of the present invention.

First, as an advance preparation, an explanation will be made in reference to FIG. 7 on the behavior of generating the topology data for path calculation 22A in the storage portion 22 of the path calculation device 20 through cooperation of the NMS 10 with the path calculation device 20.

The calculation processing portion 11 of the NMS 10 utilizes the topology information establishment portion 11A to collect information with respect to the nodes and information with respect to the links connecting the nodes, and generate the network topology information 12A based on the collected information and store the same in the storage portion 12 (step S1).

Figure 8:
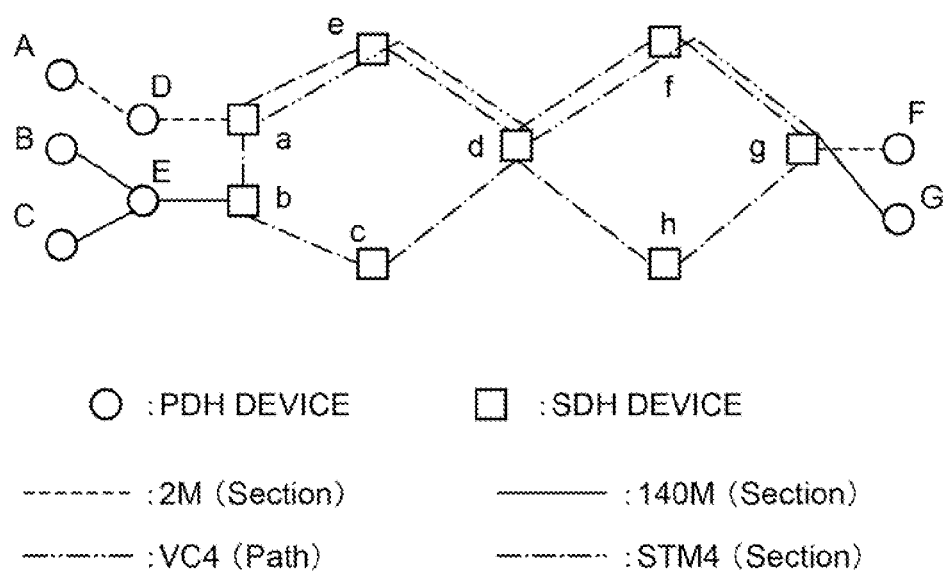
FIG. 8 shows an example of the topology of a network allowing coexistence of PDH network and SDH network.

Herein, it is supposed to generate the network topology information 12A of such a network as shown in FIG. 8, wherein "○" indicates a PDH device, "☐" indicates an SDH device, dashed line indicates 2M (section), solid line indicates 140M (section), chain line indicates STM4 (section), and two-dot chain line indicates VC4 (path).

Next, the calculation processing portion 11 of the NMS 10 utilizes the topology data conversion portion 11B to convert the topology data of the PDH network in the network topology information 12A into the topology data of the corresponding SDH network, and generate the converted network topology information 12C (step S2).

In particular, the topology data conversion portion 11B converts the PDH transfer rates in the network topology information 12A into the equivalent SDH layer rates by referring to the conversion rule 12B1 of FIG. 3. In the case of the network shown in FIG. 8, the transfer rates listed in the pre-conversion column are converted into the equivalent SDH layer rates listed in the post-conversion column with respect to the PDH sections listed in the link (section) column of FIG. 9. For example, the first line of the table in FIG. 9 shows that the node A and the node D connected through the link of the communication rate at 2 Mbps are converted to be connected through VC12.

Further, the topology data conversion portion 11B converts the PDH channel numbers in the network topology information 12A into the SDH time slot numbers by referring to the conversion rule 12B2 of FIG. 4. In the case of the network shown in FIG. 8, the channel numbers listed in the pre-conversion column are converted into the SDH time slot numbers listed in the post-conversion column with respect to the PDH sections listed in the link (section) column of FIG. 10. For example, the first line of the table in FIG. 10 shows that the node A and the node D connected through Ch10 are converted to be connected through the time slot number 10. Further, the PDH link provides only one channel for a link. Therefore, the management is such that the link through which the path does not pass has one unused channel (unused time slot after conversion), whereas the link through which the path passes has no unused channel (unused time slot after conversion).

Next, the path-calculation-use topology data generation portion 11C of the NMS 10 cooperates with the path-calculation-use topology data generation portion 21A of the path calculation device 20 to generate the topology data for path calculation 22A in the storage portion 22 of the path calculation device 20 (step S3). In particular, the calculation processing portion 11 of the NMS 10 utilizes the path-calculation-use topology data generation portion 11C to transmit the command for generating the topology data for path calculation 22A in the path calculation device 20 on the basis of the converted network topology information 12C and the node and link generation rule 12D. On the other hand, the path-calculation-use topology data generation portion 21A of the path calculation device 20 generates the topology data for path calculation 22A in the storage portion 22 by carrying out interpretation of the received command. In the case of the converted network topology information 12C of the network of FIG. 8 after the conversion has been carried out as shown in FIGS. 9 and 10, the topology data for path calculation 22A is generated as shown in FIG. 11, wherein the lower layer is not distinguished from the upper layer.

Figure 11:
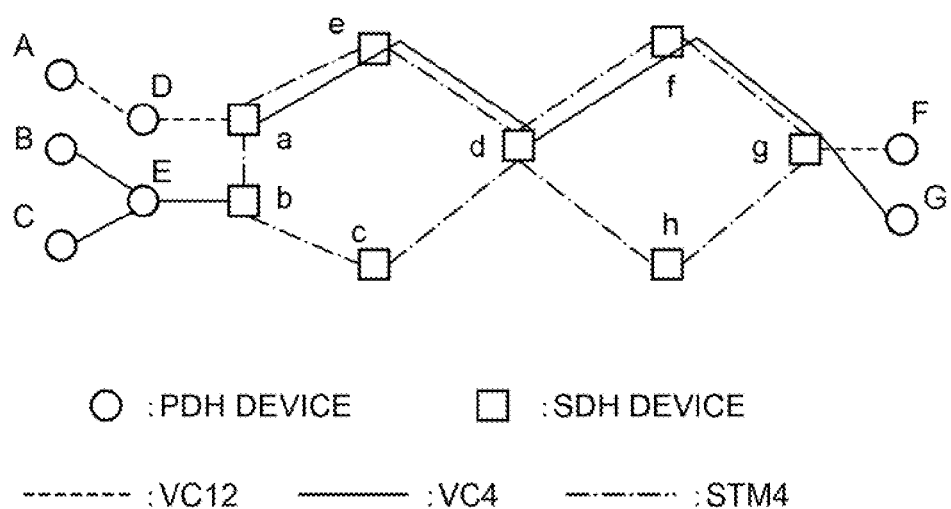
FIG. 11 shows an example of the topology information for path calculation generated in the path calculation device.

Although it is not illustrated in FIG. 11, the information of used time slot and unused time slot is included for each link of the topology data for path calculation 22A. With respect to the PDH links converted into the SDH topology information, a used channel becomes a used time slot, while an unused channel becomes an unused time slot.

Similarly, although they are not illustrated in FIG. 11, identifiers for distinguishing whether a node or a link is PDH or SDH are conferred to the nodes and links of the topology data for path calculation 22A. FIG. 12 shows an example of maintaining the identifiers for distinguishing PDH from SDH in a tabular form. In FIG. 12, "A", "A-D", and the like listed in the name column indicate the name of a node or a link. Further, "Node" and "Link" listed in the type column indicate either a node or a link. Then, "PDH" and "SDH" listed in the SDH/PDH column indicate the identifier for distinguishing PDH from SDH.

Further, in the case of generating a higher order path (step S4), the NMS 10 proceeds to carrying out the process of the step S3. Thereby, the rule R5 is applied for generating new links on the lower layer of the topology data for path calculation 22A.

Figure 13:
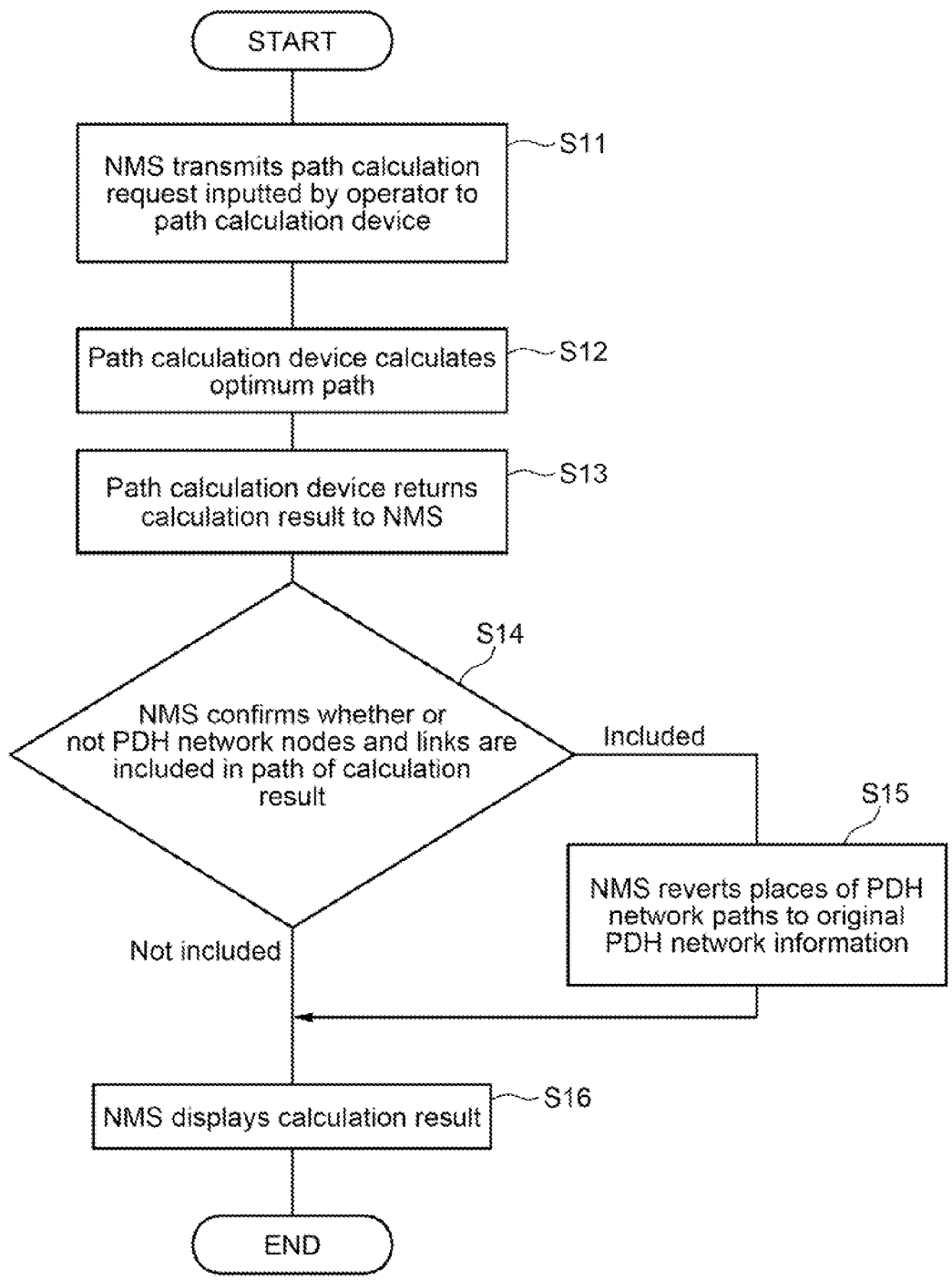
FIG. 13 is another flowchart showing the processing example of the path calculation system in accordance with the second exemplary embodiment of the present invention.

Next, an explanation will be made in reference to FIG. 13 on a behavior as the operator 40 has made a path calculation request.

When the input operation portion 14 has detected an operation of the path calculation request made by the operator 40, the calculation processing portion 11 of the NMS 10 utilizes the path calculation request acceptance/result output portion 11E to accept the path calculation request and transmit it to the path calculation device 20 (step S11).

When the path calculation request receipt/result transmission portion 21B has accepted the path calculation request transmitted from the NMS 10, the calculation processing portion 21 of the path calculation device 20 utilizes the path calculation portion 21C to calculate the optimum path in accordance with the path calculation request (step S12).

Next, the calculation processing portion 21 of the path calculation device 20 utilizes the path calculation request receipt/result transmission portion 21B to transmit the calculation result of the path calculation portion 21C to the NMS 10 (step S13).

On receiving the calculation result transmitted from the path calculation device 20, the calculation processing portion 11 of the NMS 10 utilizes the path calculation request acceptance/result output portion 11E to confirm whether or not the path of the calculation result includes any nodes and links to which the PDH identifier is conferred (step S14). If it does, then the calculation processing portion 11 of the NMS 10 utilizes the topology data conversion portion 11B to revert the information of the nodes and links to which the PDH identifier is conferred to the original PDH information (step S5). Next, the calculation processing portion 11 of the NMS 10 utilizes the path calculation request acceptance/result output portion 11E to display the calculation result on the screen display portion 15 (step S16).

On the other hand, if the path of the calculation result does not include any nodes and links of the PDH network, then the calculation processing portion 11 of the NMS 10 skips over the step S15 to the step S16 to carry out the process thereof.

Figure 14:
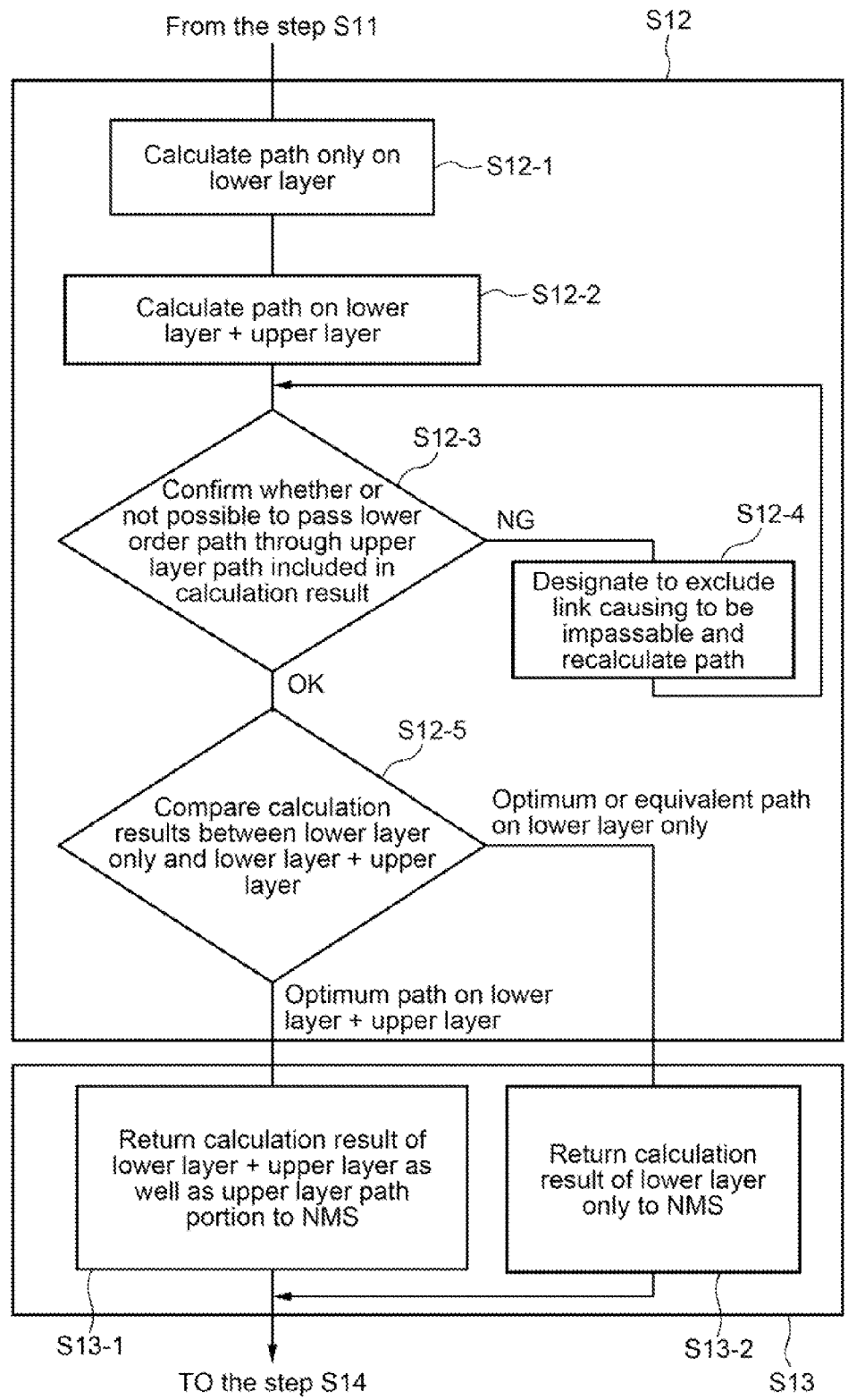
FIG. 14 is yet another flowchart showing the processing example of the path calculation system in accordance with the second exemplary embodiment of the present invention.

Next, the detailed processes of the steps S12 and S13 will be explained in reference to FIG. 14 with the case, as an example, that the operator 40 has inputted a path calculation request designating such conditions as follows:

Start node=A;
End node=F;
Node necessary to pass through=h;
Path type=VC12; and
Optimization method=cost base.

That is, it is requested to calculate a path which is the lowest in cost among the VC 12 paths from the node A to the node F via the node h.

The calculation processing portion 21 of the path calculation device 20 first utilizes the path calculation portion 21C to calculate the optimum path in answer to the path calculation request from the network composed only of the lower layer based on the topology data for path calculation 22A (step S12-1). Herein, calculating the lower layer only corresponds to calculating the existing higher order path and the lower layer link only as the object of path calculation.

Figure 15:
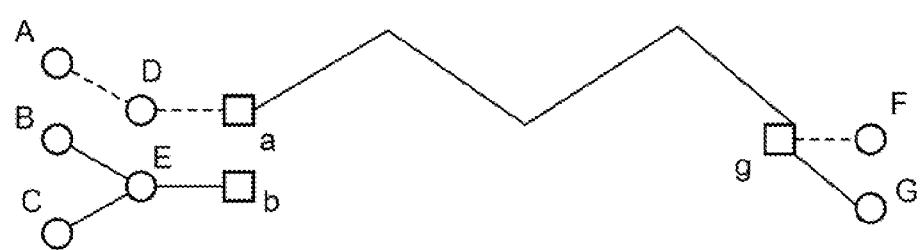
FIG. 15 shows a lower layer network for path calculation.

FIG. 15 shows the lower layer network extracted from the network of FIG. 11. As is obvious from FIG. 15, on the lower layer network, there is no path from the start node A to the end node F via the node h. Therefore, the calculation result by the step S12-1 gives no optimum path.

Next, the calculation processing portion 21 of the path calculation device 20 utilizes the path calculation portion 21C to calculate the optimum path in accordance with the path calculation request from the network linking an upper layer network to the lower layer network on the basis of the topology data for path calculation 22A (step S12-2). Herein, calculating the lower layer and the upper layer corresponds to the calculation for the case that it is necessary to newly generate a higher order path.

Figure 16:
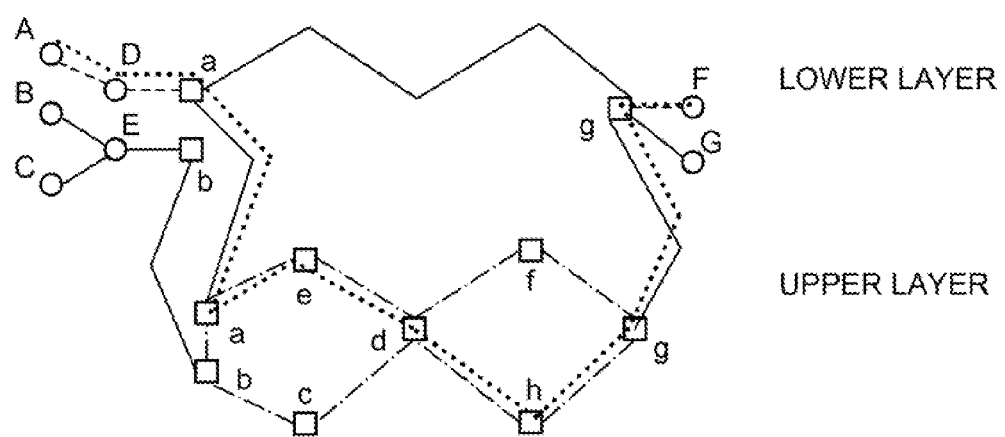
FIG. 16 shows a network for path calculation connecting an upper layer network to the lower layer network.

FIG. 16 shows the network linking the upper layer network to the lower layer network. As is obvious from FIG. 16, there are multiple paths from the start node A to the end node F via the node h, passing through both the lower layer network and the upper layer network. Herein, the path shown with the dashed line in FIG. 16 is calculated as the optimum path.

Figure 17:
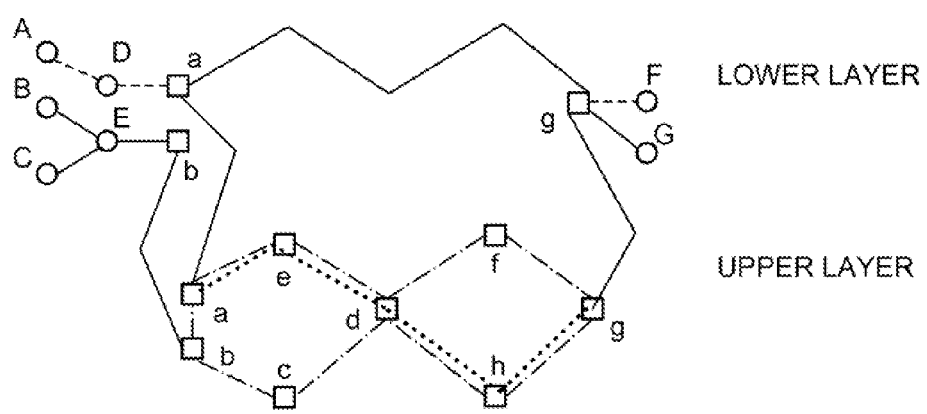
FIG. 17 shows an example of the optimum path calculated from the network for path calculation connecting the upper layer network with the lower layer network.

Next, the calculation processing portion 21 of the path calculation device 20 utilizes the path calculation portion 21C to confirm whether or not it is possible to pass the lower order path which corresponds to the path type designated by the path calculation request through the path of the upper layer included in the calculation result of the step S12-2 (step S12-3). In particular, if the calculation result of the step S12-2 is the path shown with the dashed line in FIG. 16, then as shown in FIG. 17, it confirms whether or not there is any unused passband (unused time slot) for generating a VC4 path (higher order path) on the path of the dashed line a-e-d-h-g passing through the upper layer. As a result of the confirmation, if it is possible to pass the lower order path through the upper layer included in the calculation result, then the process proceeds to the step S12-5; if it is not possible, then the process proceeds to the step S12-4.

Figure 18:
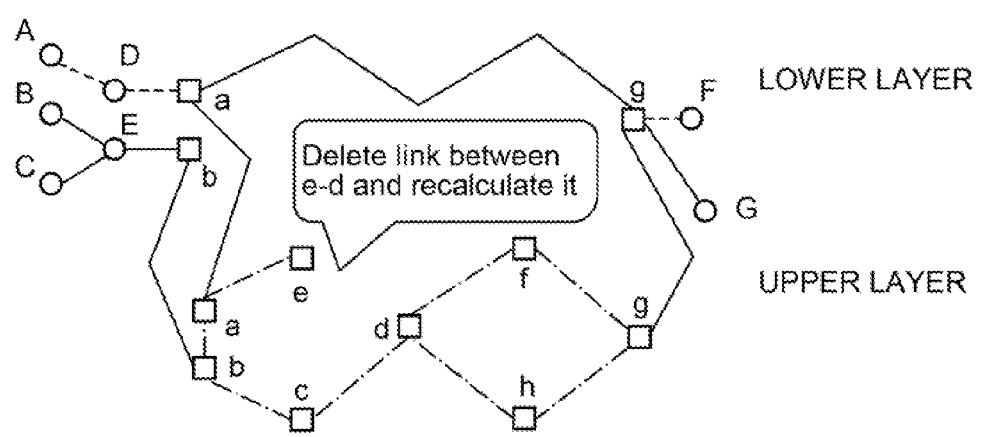
FIG. 18 shows an aspect of recalculating the path by deleting part of the links on the upper layer network.

In the step S12-4, the calculation processing portion 21 of the path calculation device 20 utilizes the path calculation portion 21C to specify the link which is the cause of being not passable thereby, designate the link to be excluded (to be deleted so as not to pass through that link), and recalculate the optimum path in accordance with the path calculation request from the network linking the upper layer network to the lower layer network (step S12-4). For example, if the shortage of unused time slot between e-d is the cause of being not passable therethrough, then as shown in FIG. 18, the link between e-d is deleted, and a recalculation is carried out. Then, the process returns to the step S12-3. The steps S12-3 and S12-4 are repeated until it becomes possible to pass the lower order path through the upper layer path included in the calculation result.

In the step S12-5, the calculation processing portion 21 of the path calculation device 20 utilizes the path calculation portion 21C to compare the path calculated by the step S12-1 (the path only passing through the lower layer network) with the path calculated by the step S12-2 or S12-4 (the path passing through both the lower layer network and the upper layer network), and thereby determine which path is the better optimized path.

If the path only passing through the lower layer network is the optimum path, or equivalent to the path passing through both the lower layer network and the upper layer network, then the calculation processing portion 21 of the path calculation device 20 utilizes the path calculation request receipt/result transmission portion 21B to transmit the path only passing through the lower layer network to the NMS 10 as the calculation result (step S13-2). On the other hand, if the path passing through both the lower layer network and the upper layer network is the optimum path in comparison with the path only passing through the lower layer network, then the calculation processing portion 21 of the path calculation device 20 utilizes the path calculation request receipt/result transmission portion 21B to transmit the path passing through both the lower layer network and the upper layer network to the NMS 10 as a calculation result (step S13-1). At the time, the calculated passable path on the upper layer is also returned to the NMS 10 as a calculation result. When the operator 40 carries out path registration based on the calculation results after path calculation, in the case of registering a lower layer path at the place where there are absolutely no upper layer paths, it is necessary to register not only the lower layer path but also the upper layer path. Therefore, the calculation result is configured to include path information on the upper layer. Further, when the operator 40 has registered an upper layer path, as described hereinbefore, the NMS 10 generates a higher order path in the step S4 of FIG. 7, and a link on the lower layer with the rule R5 in the step S3.

On receiving the calculation result transmitted from the path calculation device 20, the calculation processing portion 11 of the NMS 10 displays the reverted original PDH topology information on the screen display portion 15 if the path of the calculation result has included the SDH topology information converted from the PDH topology information (step S16). Therefore, when the path shown with the dashed line in FIG. 16 is returned as the calculation result, the calculation processing portion 11 of the NMS 10 utilizes the topology data conversion portion 11B to carry out the following conversions:

(1) Between A-D, the 2M link is to be connected through a Ch10 port;

(2) Between D-a, the 2M link is to be connected through a Ch15 port; and (3) Between g-F, the 2M link is to be connected through a Ch20 port.

Figure 19:
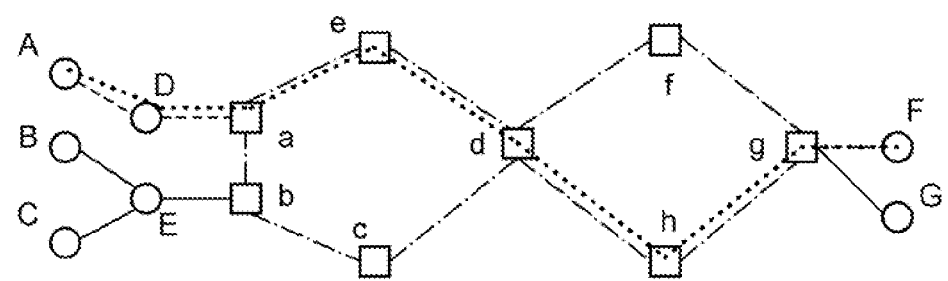
FIG. 19 shows an example of displaying the calculation result of the optimum path.

Then, the calculation processing portion 11 of the NMS 10 utilizes the path calculation request acceptance/result output portion 11E to display the information of the optimum path after undergoing the above conversion process on the screen in such a manner, for example, as shown in FIG. 19.

In this manner according to the exemplary embodiments of the present invention, it is possible to calculate optimum paths for the entire network 30 allowing coexistence of PDH network and SDH network as the object.

Further, according to the exemplary embodiments, calculation precision is improved in comparison with the method of finding the final result by dividing the network 30 allowing coexistence of PDH network and SDH network into PDH networks and SDH networks, calculating the path for each divided network, and joining up the calculated paths (to be referred to as division calculation method hereinbelow). The reason is that with the division calculation method, if the divided networks become great in number, there will be enormous combinations of the pass-through blocks from a start node to an end node; therefore, it becomes impossible to easily find which combination is the optimum one.

Further, according to the exemplary embodiments, it, is possible to reduce the amount of calculation in comparison with the calculation method which utilizes a three-level multilayer path calculation device (computational engine), and allots two layers to the SDH network and one layer to the PDH network (to be referred to as three layer method hereinbelow). The reason is that in multilayer path calculation, the greater the layer number becomes, the more complicated the algorithm and the processing logic will be to derive the optimum path therefrom.

The present invention is applicable to calculating optimum paths on the network allowing coexistence of PDH network and SDH network. Further, it is applicable to carrying out end-end management and optimum path calculation for the PDH network and SDH network combined as an integrated network by managing all aspects from mobile backhaul to SDH network with one NMS.

The whole or part of the exemplary embodiments disclosed hereinabove can also be described as, but not limited to, the following supplementary notes.

[Supplementary Note 1]

A path calculation system comprising:

a network management system (NMS) for maintaining topology information of a network allowing coexistence of PDH network and SDH network; and a path calculation device for calculating the optimum path in answer to a path calculation request from the network management system (NMS) on the basis of a topology data for path calculation generated therein, and transmitting the calculation result to the network management system (NMS), the network management system (NMS) generating the topology data for path calculation in the path calculation device in accordance with the topology information of the network after converting topology information of the PDH network into topology information of an SDH network, and reverting the SDH network topology information generated through conversion from the PDH network topology information among the SDH network topology information included in the calculation result received from the path calculation device to the PDH network topology information before the conversion.

[Supplementary Note 2]

The path calculation system according to Supplementary Note 1, wherein in converting the topology information of the PDH network into topology information of an SDH network, the network management system (NMS) converts a PDH transfer rate into an equivalent SDH layer rate, and a PDH channel number into an SDH time slot number.

[Supplementary Note 3]

The path calculation system according to Supplementary Note 1 or 2, wherein in generating the topology data for path calculation, the network management system (NMS) generates nodes and links of the PDH network only on a lower layer, nodes without endpoints of the lower layer and links connecting the same on the SDH network only on an upper layer, nodes with endpoints of the lower layer on the SDH network both on the upper layer and on the lower layer, and links connecting the nodes with endpoints of the lower layer on the SDH network only on the upper layer; and in generating a higher order path, the network management system (NMS) generates links corresponding to the generated higher order path only on the lower layer.

[Supplementary Note 4]

The path calculation system according to any one of Supplementary Notes 1 to 3, wherein in generating the topology data for path calculation, the network management system (NMS) confers an identifier to nodes and links so as to distinguish PDH from SDH.

[Supplementary Note 5]

The path calculation system according to any one of Supplementary Notes 1 to 4, wherein the path calculation device calculates paths in accordance with the path calculation request from both the network constituted only by a lower layer and the network connecting an upper layer network to the lower layer network, and outputs the optimum path of the two as the calculation result.

[Supplementary Note 6]

A path calculation method for carrying out path calculation through cooperation of a network management system (NMS) for maintaining topology information of a network allowing coexistence of PDH network and SDH network with a path calculation device connected to the network management system (NMS) via a communication line, the method comprising the steps of:

converting topology information of the PDH network in the topology information of the network into topology information of an SDH network by virtue of the network management system (NMS);

transmitting a path calculation request to the path calculation device after generating a topology data for path calculation in the path calculation device in accordance with the topology information of the network after the converting by virtue of the network management system (NMS);

calculating the optimum path in answer to the path calculation request from the network management system (NMS) on the basis of the topology data for path calculation generated in the path calculation device, and transmitting the calculation result to the network management system (NMS) by virtue of the path calculation device; and reverting the SDH network topology information generated through conversion from the PDH network topology information among the SDH network topology information included in the calculation result received from the path calculation device to the PDH network topology information before the conversion by virtue of the network management system (NMS).

[Supplementary Note 7]

The path calculation method according to Supplementary Note 6, wherein in converting the topology information of the PDH network into topology information of an SDH network, the network management system (NMS) converts a PDH transfer rate into an equivalent SDH layer rate, and a PDH channel number into an SDH time slot number.

[Supplementary Note 8]

The path calculation method according to Supplementary Note 6 or 7, wherein in generating the topology data for path calculation, the network management system (NMS) generates nodes and links of the PDH network only on a lower layer, nodes without endpoints of the lower layer and links connecting the same on the SDH network only on an upper layer, nodes with endpoints of the lower layer on the SDH network both on the upper layer and on the lower layer, and links connecting the nodes with endpoints of the lower layer on the SDH network only on the upper layer; and in generating a higher order path, the network management system (NMS) generates links corresponding to the generated higher order path only on the lower layer.

[Supplementary Note 9]

The path calculation method according to any one of Supplementary Notes 6 to 8, wherein in generating the topology data for path calculation, the network management system (NMS) confers an identifier to nodes and links so as to distinguish PDH from SDH.

[Supplementary Note 10]

The path calculation method according to any one of Supplementary Notes 6 to 9, wherein the path calculation device calculates paths in accordance with the path Calculation request from both the network constituted only by a lower layer and the network connecting an upper layer network to the lower layer network, and outputs the optimum path of the two as the calculation result.

[Supplementary Note 11]

A network management system comprising:

a topology information storage unit for maintaining topology information of a network allowing coexistence of PDH network and SDH network;

a topology data conversion unit for carrying out conversion between topology information of a PDH network and topology information of an SDH network;

a path-calculation-use topology data generation unit for generating a topology data for path calculation in a path calculation device in accordance with the topology information of the network after converting topology information of the PDH network into topology information of an SDH network by utilizing the topology data conversion unit; and a path calculation request acceptance/result output unit for transmitting a path calculation request inputted from an input operation portion to the path calculation device, reverting the SDH network topology information generated through conversion from the PDH network topology information among the SDH network topology information included in the calculation result received from the path calculation device to the PDH network topology information before the conversion by utilizing the topology data conversion unit, and outputting the reverted result on a screen display portion.

[Supplementary Note 12]

The network management system according to Supplementary Note 11, wherein in converting the topology information of the PDH network into topology information of an SDH network, the topology data conversion unit converts a PDH transfer rate into an equivalent SDH layer rate, and a PDH channel number into an SDH time slot number.

[Supplementary Note 13]

A computer program product comprising computer implementable instructions to make a computer provided with a topology information storage unit for maintaining topology information of a network allowing coexistence of PDH network and SDH network, function as:

a topology data conversion unit for carrying out conversion between topology information of a PDH network and topology information of an SDH network;

a path-calculation-use topology data generation unit for generating a topology data for path calculation in a path calculation device in accordance with the topology information of the network after converting topology information of the PDH network into topology information of an SDH network by utilizing the topology data conversion unit; and a path calculation request acceptance/result output unit for transmitting a path calculation request inputted from an input operation portion to the path calculation device, reverting the SDH network topology information generated through conversion from the PDH network topology information among the SDH network topology information included in the calculation result received from the path calculation device to the PDH network topology information before the conversion by utilizing the topology data conversion unit, and outputting the reverted result on a screen display portion.

[Supplementary Note 14]

The computer program product according to Supplementary Note 13, wherein in converting the topology information of the PDH network into topology information of an SDH network, the topology data conversion unit converts a PDH transfer rate into an equivalent SDH layer rate, and a PDH channel number into an SDH time slot number.

[Supplementary Note 15]

A network management system comprising:

a topology information storage means for maintaining topology information of a network allowing coexistence of PDH network and SDH network;

a topology data conversion means for carrying out conversion between topology information of a PDH network and topology information of an SDH network;

a path-calculation-use topology data generation means for generating a topology data for path calculation in a path calculation device in accordance with the topology information of the network after converting topology information of the PDH network into topology information of an SDH network by utilizing the topology data conversion means; and a path calculation request acceptance/result output means for transmitting a path calculation request inputted from an input operation portion to the path calculation device, reverting the SDH network topology information generated through conversion from the PDH network topology information among the SDH network topology information included in the calculation result received from the path calculation device to the PDH network topology information before the conversion by utilizing the topology data conversion means, and outputting the reverted result on a screen display portion.

The invention claimed is:

1. A path calculation system comprising:
    a network management system (NMS) for maintaining topology information of a network allowing coexistence of Plesiochronous Digital Hierarchy (PDH) network and Synchronous Digital Hierarchy (SDH) network; and
    a path calculation device for calculating an optimum path in answer to a path calculation request from the network management system (NMS) on the basis of a topology data for path calculation generated therein, and transmitting a calculation result to the network management system (NMS),
    the network management system (NMS) generating the topology data for path calculation in the path calculation device in accordance with the topology information of the network after converting topology information of the PDH network into topology information of an SDH network, and reverting the SDH network topology information generated through conversion from the PDH network topology information among the SDH network topology information included in the calculation result received from the path calculation device to the PDH network topology information before the conversion.

2. The path calculation system according to claim 1, wherein in converting the topology information of the PDH network into topology information of an SDH network, the network management system (NMS) converts a PDH transfer rate into an equivalent SDH layer rate, and a PDH channel number into an SDH time slot number.

3. The path calculation system according to claim 1, wherein in generating the topology data for path calculation, the network management system (NMS) generates nodes and links of the PDH network only on a lower layer, nodes without endpoints of the lower layer and links connecting the same on the SDH network only on an upper layer, nodes with endpoints of the lower layer on the SDH network both on the upper layer and on the lower layer, and links connecting the nodes with endpoints of the lower layer on the SDH network only on the upper layer; and in generating a higher order path, the network management system (NMS) generates links corresponding to the generated higher order path only on the lower layer.

4. The path calculation system according to claim 1, wherein in generating the topology data for path calculation, the network management system (NMS) confers an identifier to nodes and links so as to distinguish PDH from SDH.

5. The path calculation system according to claim 1, wherein the path calculation device calculates paths in accordance with the path calculation request from both the network constituted only by a lower layer and the network connecting an upper layer network to the lower layer network, and outputs the optimum path of the two as the calculation result.

6. A path calculation method for carrying out path calculation through cooperation of a network management system (NMS) for maintaining topology information of a network allowing coexistence of Plesiochronous Digital Hierarchy (PDH) network and Synchronous Digital Hierarchy (SDH) network with a path calculation device connected to the network management system (NMS) via a communication line, the method comprising the steps of:
    converting topology information of the PDH network in the topology information of the network into topology information of an SDH network by virtue of the network management system (NMS);
    transmitting a path calculation request to the path calculation device after generating a topology data for path calculation in the path calculation device in accordance with the topology information of the network after the converting by virtue of the network management system (NMS);
    calculating an optimum path in answer to the path calculation request from the network management system (NMS) on the basis of the topology data for path calculation generated in the path calculation device, and transmitting a calculation result to the network management system (NMS) by virtue of the path calculation device; and
    reverting the SDH network topology information generated through conversion from the PDH network topology information among the SDH network topology information included in the calculation result received from the path calculation device to the PDH network topology information before the conversion by virtue of the network management system (NMS).

7. The path calculation method according to claim 6, wherein in converting the topology information of the PDH network into topology information of an SDH network, the network management system (NMS) converts a PDH transfer rate into an equivalent SDH layer rate, and a PDH channel number into an SDH time slot number.

8. The path calculation method according to claim 6, wherein in generating the topology data for path calculation, the network management system (NMS) generates nodes and links of the PDH network only on a lower layer, nodes without endpoints of the lower layer and links connecting the same on the SDH network only on an upper layer, nodes with endpoints of the lower layer on the SDH network both on the upper layer and on the lower layer, and links connecting the nodes with endpoints of the lower layer on the SDH network only on the upper layer; and in generating a higher order path, the network management system (NMS) generates links corresponding to the generated higher order path only on the lower layer.

9. The path calculation method according to claim 6, wherein in generating the topology data for path calculation, the network management system (NMS) confers an identifier to nodes and links so as to distinguish PDH from SDH.

10. The path calculation method according to claim 6, wherein the path calculation device calculates paths in accordance with the path calculation request from both the network constituted only by a lower layer and the network connecting an upper layer network to the lower layer network, and outputs the optimum path of the two as the calculation result.

11. A network management system comprising:
    a topology information storage unit for maintaining topology information of a network allowing coexistence of Plesiochronous Digital Hierarchy (PDH) network and Synchronous Digital Hierarchy (SDH) network;
    a topology data conversion unit for carrying out conversion between topology information of a PDH network and topology information of an SDH network;
    a path-calculation-use topology data generation unit for generating a topology data for path calculation in a path calculation device in accordance with the topology information of the network after converting topology information of the PDH network into topology information of an SDH network by utilizing the topology data conversion unit; and
    a path calculation request acceptance/result output unit for transmitting a path calculation request inputted from an input operation portion to the path calculation device, reverting the SDH network topology information generated through conversion from the PDH network topology information among the SDH network topology information included in a calculation result received from the path calculation device to the PDH network topology information before the conversion by utilizing the topology data conversion unit, and outputting the reverted result on a screen display portion.

12. The network management system according to claim 11, wherein in converting the topology information of the PDH network into topology information of an SDH network, the topology data conversion unit converts a PDH transfer rate into an equivalent SDH layer rate, and a PDH channel number into an SDH time slot number.

\* \* \* \* \*